Aug. 24, 1937. S. M. DEL CAMP 2,091,141
SOLDERING STRIP INSTALLATION AND ATTACHING MEMBER FOR THE SAME
Filed Nov. 8, 1935
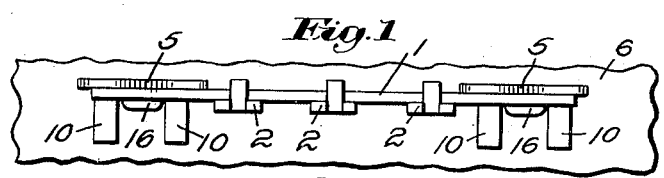
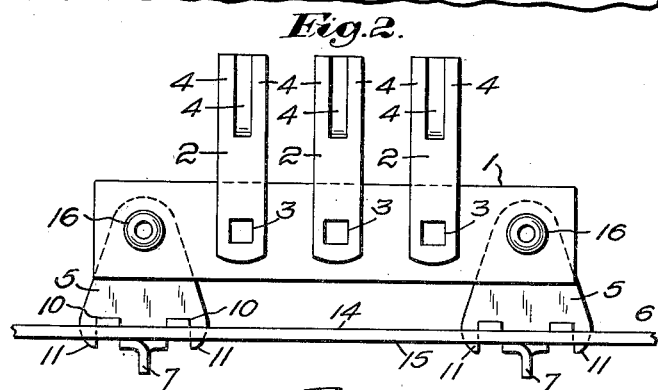
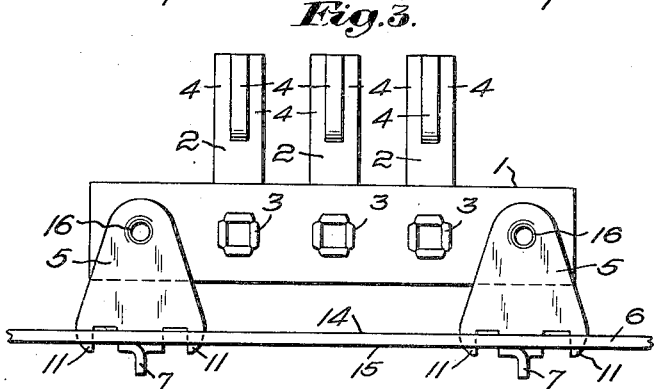
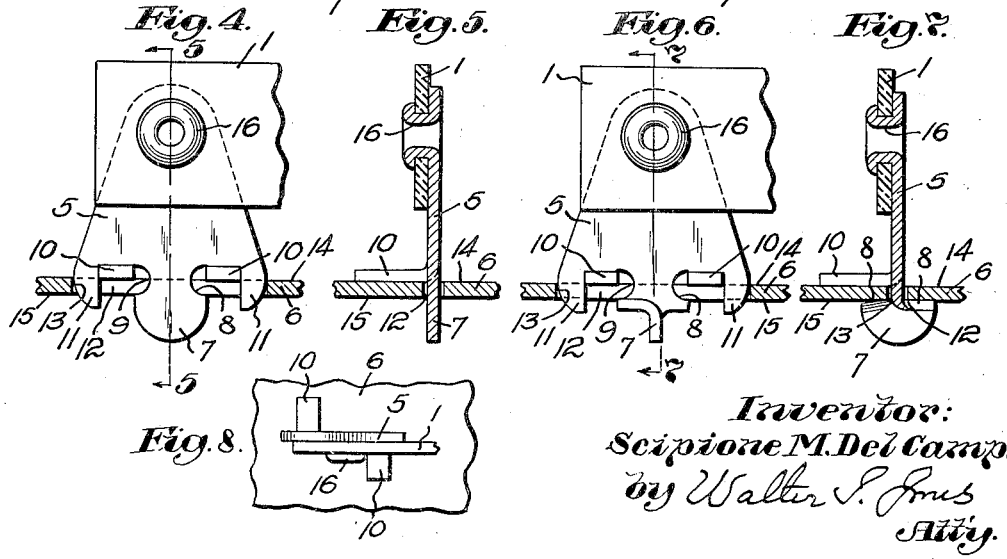
Inventor:
Scipione M. Del Camp.
by Walter S. Jones
Atty.

Patented Aug. 24, 1937

2,091,141

UNITED STATES PATENT OFFICE 2,091,141

SOLDERING STRIP INSTALLATION AND ATTACHING MEMBER FOR THE SAME

Scipione M. Del Camp, Maywood, Ill., assignor to Cinch Manufacturing Corporation, Chicago, Ill., a corporation of Illinois Application November 8, 1935, Serial No. 48,865

3 Claims. (Cl. 248—223)

My invention aims to provide improvements in a soldering lug installation and attaching members for the same, constructed for use in connection with radios and the like appliances.

In the drawing, which illustrates preferred embodiments of my invention:

Fig. 1 is a top plan view of my improved soldering lug installation;

Fig. 2 is a front view of the installation shown in Fig. 1;

Fig. 3 is a rear view of the installation shown in Figs. 1 and 2;

Fig. 4 is an enlarged front view of one of the attaching members of my installation in position for final attachment to a support;

Fig. 5 is a section taken on the line 5—5 of Fig. 4;

Fig. 6 is a view of the member shown in Fig. 4 after final engagement with a support;

Fig. 7 is a section taken on the line 7—7 of Fig. 6; and

Fig. 8 is a plan view of a portion of my installation showing a modified construction of my attaching member.

Referring specifically to the accompanying drawing, I have illustrated a soldering lug installation which is particularly adaptable for use in connection with radios or other electrical devices requiring a simple and easily attached means for receiving a plurality of wires.

In Figs. 1-3, I have shown an insulating strip 1, preferably made of bakelite or other suitable non-conducting material, having a plurality of soldering lugs 2 which are preferably attached to the strip 1 by means of the squared rivet portions 3. In my preferred form, as illustrated in Figs. 1-3, I have constructed the soldering lugs to provide a plurality of tines 4 to which wires may conveniently be attached and soldered, but I do not wish to limit my invention to that particular construction, as any lug carrying a suitable wire-receiving means may be used. Attaching members 5 are secured at one end to the strip 1 and at their other ends to a support 6 thereby providing a means for attaching the strip 1 to the support. Although I have shown two of the attaching members 5 secured to the strip 1, it is understood that any number may be used depending upon the size of the strip and the degree of firmness which is required in the installation.

The particular features of my invention are embodied in the attaching member 5, which, as illustrated in Figs. 4-7, is preferably formed of a relatively flat triangular-shaped metal plate having an integral eyelet means 16 which is located at substantially the apex of the plate and adapted for riveting the member to the strip 1.

Integral with the base of the plate and substantially in the center thereof, I have formed a projection providing a head portion 7 having the shoulders 8, and a shank portion 9 connecting the head to the plate 5. The purpose of the shoulders 8 will be hereinafter more fully described. Supporting lugs 10 are bent from the material of the plate at predetermined points on the length of the plate and extended at substantially right angles to the plate, as best illustrated in Figs. 5 and 7. Finally, the projections 11 are formed as a continuation of the opposite edges of the plate.

The support 6 is preferably a relatively thin metal plate provided, as best illustrated in Figs. 4-7, with a number of elongated apertures 12 which are formed of a predetermined length and spaced apart at proper distances to receive the attaching members 5.

In assembling the parts of my installation together, the members 5, which have been previously attached to the lug-carrying strip 1 are extended into respective apertures 12 in the support so that the head portion 7 of the middle projection and portions of the projections 11 will extend entirely through the aperture (Figs. 4 and 5). The outer edges of the projections 11 will engage the walls 13 surrounding the aperture 12, and the supporting lugs 10 will bear upon one face 14 of the support, as shown in Fig. 5, thereby preventing the attaching members from extending through the aperture for more than a predetermined distance. The attaching member is now in position for final attachment to the support and this act is accomplished by twisting the head portion 7 of the middle projection with a suitable tool so that the shoulders 8 will span the aperture 12 and bear upon the face 15 of the support adjacent the aperture, as best shown in Figs. 6 and 7. The projections 11 will prevent any longitudinal movement of the members and the shoulders 8 and the supporting lugs 10 engaging opposite faces of the support will cooperate to maintain the members in fixed position upon the support.

In Fig. 8, I have illustrated the same attaching member shown in Figs. 1-7 with the exception of the supporting lugs 10 which engage the face 14 of the support at opposite sides of the member 5 instead of on the same side as shown in Figs. 4-7. This modified construction will enable a more rigid attachment by preventing any rocking movement of the members relative to the support.

While I have illustrated and described a preferred embodiment of my invention, I do not wish to be limited thereby, because the scope of my invention is best defined in the following claims.

I claim:

1. In combination with a supporting plate having a plurality of elongated apertures, of means for supporting an article in spaced relation to said plate comprising a plurality of attaching members secured to said article, each of said members having an integral bendable lug extending through an aperture and adapted to be twisted to contact one side of said plate, shoulders on said members to contact the other side of said plate, and means on said members for contacting said plate adjacent the ends of said apertures to position said members in said apertures.

2. In combination with a supporting plate having a plurality of elongated apertures, of means for supporting an article in spaced relation to said plate comprising a plurality of attaching members secured to said article, each of said members having an integral projection extending through the respective aperture of said support and being twisted whereby portions of said projection will bear upon the support adjacent to said aperture and means bent from opposite sides of said member and engaging the face of said support opposite the face engaged by said projection, said means and said projection cooperating to maintain said article in a relatively fixed position on said supporting plate.

3. In combination with a supporting plate having a plurality of elongated apertures, of means for supporting an article in spaced relation to said plate comprising a plurality of attaching members secured to said article, each of said members having an integral headed projection extending from the mid portion of one end of a member through an aperture in the support and being twisted whereby portions of said head will engage one face of said support, other projections located adjacent to opposite edges of the end where the headed projection is located and extending into said aperture to engage the walls thereof adjacent to the end thereby assisting in holding said attaching member in position and shoulder means contacting the other side of said plate and cooperating with said headed projection and other projections to maintain said article in fixed position relative to said supporting plate.

SCIPIONE M. DEL CAMP.